United States Patent [19]

Guzinski et al.

[11] Patent Number: 5,200,227
[45] Date of Patent: Apr. 6, 1993

[54] STABLE AQUEOUS SOLUTIONS OF TETRAHYDRO AND HEXAHYDRO ISO-ALPHA ACIDS

[75] Inventors: James A. Guzinski; Larry J. Stegink, both of Kalamazoo, Mich.

[73] Assignee: Kalamazoo Holdings, Inc., Kalamazoo, Mich.

[21] Appl. No.: 881,458

[22] Filed: May 11, 1992

[51] Int. Cl.$^5$ ............................................. C12C 3/00
[52] U.S. Cl. ................................. 426/600; 568/377
[58] Field of Search ......................... 426/600; 568/377

[56] References Cited

U.S. PATENT DOCUMENTS

| | | | |
|---|---|---|---|
| 3,751,266 | 8/1973 | Kuroiwa | 426/600 |
| 3,875,316 | 4/1975 | Humphrey | 426/600 |
| 4,302,479 | 11/1981 | Humphrey | 426/600 |
| 4,338,348 | 7/1982 | Muller | 426/600 |
| 4,342,791 | 8/1982 | Baker | 426/600 |
| 5,013,571 | 5/1991 | Hay | 426/600 |

*Primary Examiner*—Carolyn Paden
*Attorney, Agent, or Firm*—Gordon W. Hueschen

[57] ABSTRACT

New stable, concentrated aqueous solutions of tetrahydro iso-alpha acid (THIA) and hexahydro iso-alpha acid (HHIA) are disclosed. These solutions depend upon the presence of a second kind of iso-alpha acid to increase the solubility of both iso-alpha acids to a point outside of the ranges of their normal solubilities ... in the case of THIA and HHIA, to a point above their solubility ranges and, in the case of unreduced iso-alpha acid (UIA) and dihydro iso-alpha acid (DHIA), to a point below their commercial prior-art solubility ranges. This "inversion" of solubility and stability behavior in water, which requires the presence of two different kinds of iso-alpha acids, is new to the art, and provides a novel approach for making commercially-desirable concentrates of THIA and HHIA available to the brewer.

20 Claims, No Drawings

STABLE AQUEOUS SOLUTIONS OF TETRAHYDRO AND HEXAHYDRO ISO-ALPHA ACIDS

FIELD OF INVENTION

Stable single-phase aqueous solutions of a plurality of iso-alpha acids; in this case a single phase aqueous solution containing tetrahydro iso-alpha acids or hexahydro iso-alpha acids at a concentration which cannot be attained with that particular iso-alpha acid alone, together with another type of iso-alpha acid which serves to solubilize the tetrahydro iso-alpha acid or hexahydro iso-alpha acid and stabilize the solution.

BACKGROUND OF THE INVENTION AND PRIOR ART

The bitterness of beer is due to the presence of iso-alpha acids. In traditional brewing, they are formed during the boiling of the hops in the kettle. This produces unreduced iso-alpha acids (UIA) which are unstable in light, producing off-flavors. To overcome this deficiency, hydrogenation of the unreduced iso-alpha acids (UIA) to form dihydro (DHIA), tetrahydro (THIA), and hexahydro (HHIA) iso-alpha acids has been commercialized, and these three different kinds of reduced molecules are now routinely used in the brewing art.

While all of the reduced kinds (forms) provide stability to light, the art has now recognized that the tetrahydro and hexahydro kinds increase the foam, cling, and mouthfeel as compared with unreduced or dihydro iso-alpha acids. In some instances, they are used for these effects alone, i.e., even though light stability is not required.

While all of these hop bitter acids can be added to the kettle in the form of a paste or solid, the preferred point of addition is after fermentation. This improves the control of the flavor and improves the efficiency with which the hop herb is converted into bitter acids. Formulations for post-fermentation addition of iso-alpha acids are described in three patents, all of which permit dilution in water to form 1% to 2% solutions of the bitter acids prior to addition to the beer. The formulations employed also depend upon the pH adjustment of the liquid iso-alpha acid composition to achieve a stable, single-phase, concentrated, liquid solution.

In the art, the term isohumulone has been used generically to describe the collection of analogues, which differ in a side chain. At the present time, the term iso-alpha acid is preferably used to describe this mixture. For the purposes of this specification, the term iso-alpha acid will be used and include all the analogues present in the parent hop. Furthermore, di-,tetra-, and hexa-hydro denote the addition of two, four, or six hydrogens to the unreduced molecule without changing the side chain. Accordingly, four distinct molecular kinds of iso-alpha acids are used commercially. Each kind has its specific attributes and behavior.

1. Mitchell, U.S. Pat. Nos. 3,973,092 and 3,973,052, describes a concentrated soft extract, consisting of potassium isohumulate (UIA), and containing 15% to 25% water. In addition, he claims a mixture consisting of 40% to 60% isohumulate in the former patent, and a mixture containing 16% to 72% water (84% to 28% isohumulate) in the latter patent. While not describing the preferred concentration, the commercial practice is now to provide a 30% solution of iso-alpha acids to the brewer. This solution is stable, does not separate into two phases on standing, and can be added to water to make a 1% to 2% solution of iso-alpha acids, which is also stable. This can then be dosed into the fermented beer.

2. Westermann, U.S. Pat. No. 3,798,332, describes stable solutions of dihydro iso-alpha acids (DHIA), and finds that a single-phase aqueous solution can be obtained at concentrations greater than 30%, and optimally between about 35% and 40%. This product, which is light stable, is commercially provided as a 35% solution in water.

It should be noted that there is a critical lower limit to the concentration of the iso-alpha acids in both the Mitchell and Westermann formulations, it being 28% for the former, and 30% for the latter.

3. Todd, U.S. Pat. No. 3,486,906, showed that when propylene glycol or glycerine were used as carriers, a stable single-phase solution could be made containing between about 5% and 30% or more by weight of iso-alpha acids, which include all the kinds and forms of the bitter acids mentioned above, provided the solutions contain less than 25% water. These solutions are available commercially at 20% to 30% iso-alpha acid concentration.

However, the tetrahydro and hexahydro kinds of alpha-acids do not behave like the unreduced or dihydro kinds in water. They cannot be made into stable single-phase solutions at the commercially desirable concentrations of 20% to 35%. Tetrahydro can be made into a stable single-phase solution in water at a maximum concentration of 10% to 11%, and is provided commercially as a 10% solution. Hexahydro is not soluble in water above about 5%, and is not available except as a solution in propylene glycol. The presently-preferred concentrations of 20% to 30% of these two desirable reduced kinds must therefore be formulated according to Todd, using propylene glycol or glycerine.

In summary, the art shows that the concentration for stable aqueous solutions of unreduced and dihydro iso-alpha acids must be 28% to 30% minimum, for tetrahydro it is 10% maximum, and there is presently no commercially viable aqueous solution of hexahydro.

GENERAL DESCRIPTION OF THE INVENTION

The present invention provides new totally aqueous formulations containing tetra and/or hexahydro iso-alpha acids which have commercially valuable concentrations. This eliminates the necessity and expense of propylene glycol or glycerine and eliminates the use of these incidental additives where desired.

In the discussions which follow, the abbreviations for the various forms of iso-alpha acids will be: unreduced—UIA; dihydro—DHIA; tetra—THIA; hexa—HHIA.

OBJECTS OF THE INVENTION

It is an object of the invention to provide new stable single-phase aqueous solutions containing a plurality of iso-alpha acids at commercially valuable concentrations which are not attainable when a single iso-alpha acid is present alone.

A particular object is the provision of such solutions containing tetrahydro or hexahydro iso-alpha acids together with another and different type of iso-alpha acid which serves to solubilize the tetrahydro or hexahydro iso-alpha acid and stabilize the solution.

Further objects of the invention will become apparent hereinafter and still others will be obvious to one skilled in the art to which this invention pertains.

SUMMARY OF THE INVENTION

The invention, then, comprises the following, inter alia, singly or in combination:

A single-phase aqueous alkaline solution containing tetrahydro iso-alpha acids or hexahydro iso-alpha acids in solution at a concentration which cannot be attained with that particular iso-alpha acid alone, together with another type of iso-alpha acid which serves to solubilize the tetrahydro iso-alpha acid or hexahydro iso-alpha acid and stabilize the solution; such a single-phase aqueous solution containing 11% or more by weight of tetrahydro iso-alpha acids and 6% or more by weight of hexahydro iso-alpha acids, having a minimum concentration of both iso-alpha acids of at least 17% by weight; such a single-phase aqueous solution wherein the total concentration of iso-alpha acids is between about 20 and 35% by weight; such a single-phase stable solution wherein the ratio of tetrahydro iso-alpha acids to hexahydro iso-alpha acids is between about 2:1 and 1:2 by weight; such a single-phase stable solution containing at least 6% by weight of unreduced iso-alpha acids and at least 6.5% by weight of hexahydro iso-alpha acids, the total concentration of iso-alpha acids being up to about 42% by weight; such a single-phase stable solution wherein the amount of unreduced iso-alpha acids is up to about 26% by weight and the amount of the hexahydro iso-alpha acids is up to about 30% by weight; such a single-phase stable solution wherein the concentration of hexahydro iso-alpha acids is between about 10 and 20% by weight and the concentration of unreduced iso-alpha acids is between about 10 and 20% by weight; such a single-phase stable solution containing at least 5% by weight of dihydro iso-alpha acids and a tetrahydro iso-alpha acid concentration of at least 15% by weight, the total concentration of iso-alpha acids being between about 25% and about 40% by weight; such a single-phase stable solution wherein the solution contains at least 15% by weight tetrahydro iso-alpha acids and at least 5% dihydro iso-alpha acids by weight, the total concentration of iso-alpha acids being between about 30% and 35% by weight and the weight ratio of DHIA to THIA being about 1:3 to 2:1; such a single-phase stable solution having at least 13% tetrahydro iso-alpha acids by weight and a least 14% unreduced iso-alpha acid, and the total concentration of iso-alpha acids being at least about 27% by weight; such a single-phase stable solution wherein the weight ratio of UIA to THIA is about 3:7 to 7:3 and the total concentration is between about 25% and 45% by weight; such a single-phase stable aqueous solution containing at least about 14% unreduced iso-alpha acids and 13% tetra-hydro iso-alpha acids, the total iso-al acid content of their solution being at least about 27% by weight, and including less than about 1% hop oil by weight; such a single-phase stable aqueous solution containing at least about 8% hexahydro iso-alpha acids and at least about 10% dihydro iso-alpha acids, the maximum total concentration of iso-alpha acids being about 40% by weight; such a single-phase stable aqueous solution wherein the concentration by weight of hexahydro iso-alpha acids is between about 10% and 20% by weight and the concentration of dihydro iso-alpha acids is between about 10% and 20% by weight, the total concentration of iso-alpha acids being between about 25% and 35% by weight.

Moreover, a single-phase aqueous alkaline solution containing more than 10% THIA by weight and at least one other type of iso-alpha acid, which serves to solubilize the THIA; such a single-phase aqueous alkaline solution containing THIA at a concentration greater than 10%, and a second iso-alpha acid at a concentration greater than 13%; such a single-phase stable aqueous alkaline solution wherein the second iso-alpha acid is selected from the group consisting of HHIA, DHIA, and UIA.

Also, a single-phase aqueous alkaline solution containing more than 6% HHIA by weight and containing at least one other type of iso-alpha acid, which serves to solubilize the HHIA; such a single-phase aqueous alkaline solution containing HHIA at a concentration greater than 6% by weight, and a second iso-alpha acid at a concentration of at least 6% by weight; and such a single-phase stable aqueous alkaline solution wherein the second iso-alpha acid is selected from the group consisting of THIA, DHIA, and UIA.

SPECIFIC DESCRIPTION OF THE INVENTION

The following Examples are given to illustrate the invention but are not to be construed as limiting.

The following examples describe new and novel aqueous alkaline, pH 8.0–10.5, preferably about 8.5–9, solutions of THIA and HHIA at commercially practical concentrations, which overcome the limitations of the prior art. These solutions also permit the introduction of hop aroma oils into the beer at the same time as the bitter acids are introduced, which is not possible at the low concentrations in water of the existing THIA and HHIA formulations.

EXAMPLE 1.

A preferred mixture of THIA and HHIA.

This mixture provides both light stability to the beer and greatly improved foam and cling characteristics.

Crude THIA and HHIA were taken into hexane, and extraneous hop-derived materials removed by procedures known to the art. The iso-alpha acids were transferred to an aqueous solution by the slow addition, with agitation, of KOH until a pH of about 9 to 10 was reached. This is the preferred method of making mixtures of the different kinds of iso-alpha acids. For unknown reasons, mixing hexane solutions of the acids, and then transferring the iso-alpha acids to the aqueous phase, removes extraneous materials not removed in the original purification. The resulting mixtures are therefor more clear upon the final dilution into water, prior to addition to beer.

The aqueous iso-alpha acids phase was steam-stripped to remove residual hexane, and the final concentration was 13.2% HHIA and 11.9% THIA by HPLC. It did not separate upon standing. It was added directly to deionized water adjusted to pH 10, to form a 1% hop acid solution, which was clear. Upon injection of this solution into an unhopped beer to give 10 ppm total hop acids, the resulting beverage possessed the typical hop bitterness and had much improved foam, cling, and mouth feel as compared to traditionally hopped beer. If such a beer were brewed in the absence of unreduced hop acids, it would be light stable also. It should be noted that the presence of the HHIA raises the solubility of the THIA to greater than 11%, its maximum by itself; and that the presence of THIA raises the solubility of HHIA above its maximum solubility of 5% when present alone.

This mutually solubilizing and stabilizing effect occurs with mixtures containing 11% or more of THIA and of 6% or more of HHIA. The minimum concentration of the combined mixture must be at least 17%, and is preferably 20% to 35%, although more concentrated solutions are possible. Preferred ranges are 2:1 to 1:2 THIA:HHIA. At a 35% total acid concentration, the concentration is two to four times the solubility limit of HHIA by itself.

If HPLC analysis is not feasible, the concentration of the total mixture can be determined by measuring the absorbance in alkaline methanol, using procedures known to the art, and the composition estimated by the amounts in the two feedstocks.

In the following examples, no distinction is made in the manner of preparation. When the above procedure was not used, the different types of iso-alpha acids were first purified and their aqueous solutions combined If tars or waxes precipitated, they were removed as the final purification step. Unless otherwise noted, composition is based on the feedstocks and concentration on ultraviolet absorbance.

EXAMPLE 2

HHIA and UIA. These combinations provide a means of utilizing the conventional cheaper UIA, while gaining the foam-stabilizing advantages of HHIA. The minimum amount of UIA required is 6%, which will stabilize up to about 30% HHIA; the minimum amount of HHIA required is 6.5 to 7%, which will stabilize up to 26% UIA. The maximum desirable amount of UIA is 26%, and the maximum total concentration is 42%. Optimal concentrations are 10%–20% HHIA and 10%–20% UIA. Preferred total is 30–35%.

This example demonstrates the unexpected nature of this invention: an amount of UIA below that which the prior art shows forming a stable solution by itself is required; and an amount of HHIA above that which forms a stable solution by itself is required. It is simply fortuitous that the optimal ratios of the two kinds are encompassed by these parameters.

EXAMPLE 3

DHIA and THIA. These different light-stable bitter acids form stable solutions when the DHIA is above 5%, and the THIA is above 15%. Optimal ratios, depending upon brewhouse needs, are 1:3 to 2:1 DHIA:THIA, and total concentrations 25% to 40%, and most preferably 30% to 35%.

EXAMPLE 4

THIA and UIA. These combinations provide the same advantages as Example 2. A preferred combination is 13% THIA and 17% UIA, at which concentration individual solutions of these components separate. Optimal ratios are between 3:7 and 7:3 UIA:THIA, and total concentrations 30% to 35%, although none of these ratios are limiting.

Such mixtures, when dosed into a partially kettle hopped beer, to give 3 ppm of THIA, greatly improve the foam, cling, and mouthfeel of the beer as compared to the same beer dosed only with UIA.

EXAMPLE 4a

To further demonstrate the unexpected nature of this invention, a 15% solution of THIA was made in hot water at pH 9, which separated upon cooling into an aqueous phase of 11% THIA and an insoluble organic phase. An alkaline mixture of UIA and THIA was combined and diluted to give 15% each in hot water. On cooling, the aqueous phase contained 28% iso-alpha acids, and approximately 1% of each acid was lost to the unwanted waxy organic phase. Therefore the solubility of THIA was increased by the presence of UIA. The 28% solution was added to distilled water at pH 10 and gave a clear solution until a concentration of above 2% was reached. At 5% the solution was cloudy, showing that the co-solvating effect is lost at intermediate concentrations of total iso-alpha acids, which emphasizes the criticality of the concentrations of the mixture.

The single-phase 28% solution was concentrated under reduced pressure at 60° C., to give a lower viscous organic phase which was 61% iso-alpha acids, which were not soluble in water at room temperature, and an 11% aqueous phase. This shows that there is an upper limit of concentration at which the cosolvent effect is inoperative. This limit, for practical purposes, is about 45%, and preferably the preparations are between 25% and 40% in total concentration of iso-alpha acids.

EXAMPLE 4b

Hexane solutions containing crude UIA and THIA were combined in a ratio of 4 parts UIA to 3 parts THIA, and the hexane solution was washed with water to remove traces of water soluble impurities. Ten percent (10%) KOH was then added to the hexane phase until a pH of 9 was reached, the aqueous iso-alpha acid phase separated, residual hexane removed, and the aqueous phase adjusted with the addition of water to give a stable single-phase 30% iso-alpha acid solution containing 17% UIA and 13% THIA. This solution, when added to pH 10 water to a concentration of 2% acids, as is normal in brewhouse practice, was clear.

EXAMPLE 4c

A particularly advantageous form is a 35% solution of 15% UIA and 20% THIA which incorporates a hop oil. Although the hop oil is oil soluble and water insoluble, it becomes evenly distributed in the mixture of iso-alpha acids. Previously, this could only be achieved using propylene glycol as a co-solvent. With the presence of the reduced iso-alpha acids, an organic co-solvent is not required.

For example, if it is desired to add 10 ppm of iso-alpha acids and 100 ppb of hop oil to a beer after fermentation, the 35% mixture of UIA and THIA will contain 0.35% hop oil. This may then be diluted to 2% hop acids in water and dosed into beer to contribute both hop bitterness and aroma.

EXAMPLE 5

DHIA and HHIA. This combination is similar to Example 3 in its usefulness in brewing. A single-phase, stable solution requires a minimum of about 8% HHIA, and a minimum of 10% DHIA. A maximum total concentration is about 40%. An optimal formulation is 10%-20% HHIA and 10%-20% DHIA, which is two to four times the maximum solubility of HHIA by itself. A total iso-acid concentration of between 25% and 35% is preferred.

EXAMPLE 6

Ternary and quaternary mixtures. This invention permits the compounding of single-phase solutions of DHIA, THIA, and HHIA or UIA, or all four types of acids. While these may have limited utility, mixtures of the above solutions will be found compatible. For example, an aqueous solution containing 12% each UIA, THIA, and HHIA is stable.

EXAMPLE 7

Admixtures with hop essential oil. The hoppy aromatic quality of beer is contributed by hop essential oil, which can be recovered from the hop cones and added post-fermentation. While these oils are insoluble in water, they may be incorporated in the above solutions. These in turn are introduced post-fermentation to give both the desired bitter and aromatic qualities to the beer. The prior art requires the presence of alcohol or propylene glycol to solubilize the hop oils, and this invention provides a new procedure for adding hop oils together with iso-alpha acids, utilizing solely aqueous solutions.

To the mixture of Example 1 was added an oxygenated hop oil fraction, in the amount of ⅛% by weight. It did not destabilize the mixture. When the solution was further diluted and added to beer, both the hop bitterness and aromatic quality were perceived. Either more or less hop oil may be incorporated, depending upon the level of hoppy aroma desired.

THIA. The need for propylene glycol for the preparation of liquid forms of HHIA is eliminated.

It is to be understood that the present invention is not to be limited to the exact details of operation, or to the exact compounds, compositions, methods, procedures, or embodiments shown and described, as various modifications and equivalents will be apparent to one skilled in the art, wherefore the present invention is to be limited only by the full scope which can be legally accorded to the appended claims.

We claim:

1. A single-phase aqueous alkaline solution containing tetrahydro iso-alpha acids or hexahydro iso-alpha acids in solution at a concentration which cannot be attained with that particular iso-alpha acid alone, together with another type of iso-alpha acid which serves to solubilize the tetrahydro iso-alpha acid or hexahydro iso-alpha acid and stabilize the solution.

2. A single-phase aqueous solution of claim 1 containing 11% or more by weight of tetrahydro iso-alpha acids and 6% or more by weight of hexahydro iso-alpha acids, having a minimum concentration of both iso-alpha acids of at least 17% by weight.

3. A single-phase aqueous solution of claim 2, wherein the total concentration of iso-alpha acids is between about 20 and 35% by weight.

4. A single-phase stable solution of claim 3, wherein the ratio of tetrahydro iso-alpha acids to hexahydro iso-alpha acids is between about 2:1 and 1:2 by weight.

5. A single-phase stable solution of claim 1 containing at least 6% by weight of unreduced iso-alpha acids and at least 6.5% by weight of hexahydro iso-alpha acids, the total concentration of iso-alpha acids being up to about 42% by weight.

6. A single-phase stable solution of claim 5, wherein the amount of unreduced iso-alpha acids is up to about 26% by weight and the amount of the hexahydro iso-

| CHART OF EXAMPLES VS. PRIOR ART | | | | | | |
|---|---|---|---|---|---|---|
| Prior Art Single Substance Compositions | | | | | | |
| | UIA | DHIA | | THIA | HHIA | |
| PrArt | 28–84 | >30 | | | | |
| Commerc | 30 | 35 | | 10 | pg only | |
| According to the Present Invention | | | | | | |
| Examples | | | | Commercial Optimal Range Cited % by Weight | | |
| Ex # | | | Total | UIA  DHIA | THIA  HHIA | Total |
| 1 | | | 11.9 | 13.2 | >11   >6 | ≧17, p20–35 |
| 2 | ≧6–26 | | ≧6.5–30 | 10–20,max 26 | 10–20 | 30–35, 42 max |
| 3 | | >5  >15 | | 1:3 to 2:1 DHIA/THIA, 25–40, | | 30–35, opt |
| 4 | 17 | | 13 | at least 30  17 | 13 { optimal range 3:7 to 7:3 UIA/THIA } | 30–35 |
| 4a | 14 | | 14 | 28 | | 25–40 (45 max) |
| 4b | 17 | | 13 | 30 | | |
| 4c | 15 | | 20 | hop oil 35 | | |
| 5 | | ≧10 | ≧8 | | 10–20  10–20 | 25–35 (40 max) |
| 6 | 12 | | 12 | 12 | | |
| 7 | hop oils | | | | | |

The foregoing Examples and disclosure provide new and novel forms of THIA and HHIA and, for the first time, show that commercially-viable aqueous solutions of these light-stable, foam-enhancing types of iso-alpha acids can be made in concentrations greater than about 10%. This remarkable result is achieved by combining either of these types of iso-alpha acid with a second type. Concentrations in the ranges of 25% to 35% are readily achieved, which greatly reduces handling and freight costs as compared to present 10% solutions of alpha acids is up to about 30% by weight.

7. A single-phase stable solution of claim 6, wherein the concentration of hexahydro iso-alpha acids is between about 10 and 20% by weight and the concentration of unreduced iso-alpha acids is between about 10 and 20% by weight.

8. A single-phase stable solution of claim 1 containing at least 5% by weight of dihydro iso-alpha acids and a tetrahydro iso-alpha acid concentration of at least 15% by weight, the total concentration of iso-alpha acids being between about 25% and about 40% by weight.

9. A single-phase stable solution of claim 8, wherein the solution contains at least 15% by weight tetrahydro iso-alpha acids and at least 5% dihydro iso-alpha acids by weight, the total concentration of iso-alpha acids being between about 30% and 35% by weight and the weight ratio of dihydro iso-alpha acids to tetrahydro iso-alpha acids being about 1:3 to 2:1.

10. A single-phase stable solution of claim 1 having at least 13% tetrahydro iso-alpha acids by weight and at least 14% unreduced iso-alpha acid, and the total concentration of iso-alpha acids being at least about 27% by weight.

11. A single-phase stable solution of claim 10, wherein the weight ratio of unreduced iso-alpha acids to tetrahydro iso-alpha acids is about 3:7 to 7:3 and the total concentration is between about 25% and 45% by weight.

12. A single-phase stable aqueous solution of claim 1 containing at least about 14% unreduced iso-alpha acids and 13% tetrahydro iso-alpha acids, the total iso-alpha acid content of the solution being at least about 27% by weight, and including less than about 1% hop oil by weight.

13. A single-phase stable aqueous solution of claim 1 containing at least about 8% hexahydro iso-alpha acids and at least about 10% dihydro iso-alpha acids, the maximum total concentration of iso-alpha acids being about 40% by weight.

14. The single-phase stable aqueous solution of claim 13, wherein the concentration by weight of hexahydro iso-alpha acids is between about 10% and 20% by weight and the concentration of dihydro iso-alpha acids is between about 10% and 20% by weight, the total concentration of iso-alpha acids being between about 25% and 35% by weight.

15. A single-phase aqueous alkaline solution containing more than 10% tetrahydro iso-alpha acids by weight and at least one other type of iso-alpha acid, which serves to solubilize tetrahydro iso-alpha acids.

16. A single-phase aqueous alkaline solution of claim 15 containing tetrahydro iso-alpha acids at a concentration greater than 10%, and a second iso-alpha acid at a concentration greater than 13%.

17. A single-phase stable aqueous alkaline solution according to claim 16, wherein the second iso-alpha acid is selected from the group consisting of hexahydro iso-alpha acids, dihydro iso-alpha acids, and unreduced iso-alpha acids.

18. A single-phase aqueous alkaline resolution containing more than 6% hexahydro iso-alpha acid by weight and containing at least one other type of iso-alpha acid, which serves to solubilize the hexahydro iso-alpha acid.

19. A single-phase aqueous alkaline solution of claim 18 containing hexahydro iso-alpha acids at a concentration greater than 6% by weight, and a second iso-alpha acid at a concentration of at least 6% by weight.

20. A single-phase stable aqueous alkaline solution according to claim 19, wherein the second iso-alpha acid is selected from the group consisting of tetrahydro iso-alpha acid, dihydro iso-alpha acid and unreduced iso-alpha acids.

* * * * *

UNITED STATES PATENT AND TRADEMARK OFFICE
CERTIFICATE OF CORRECTION

PATENT NO. : 5,200,227

DATED : Apr. 6, 1993

INVENTOR(S) : James A. Guzinski, Larry J. Stegink

It is certified that error appears in the above-identified patent and that said Letters Patent is hereby corrected as shown below:

```
Column 3, line 64; "iso-al" should read -- iso-alpha --.
Column 10, line 19; "resolution" should read -- solution --.
Column 10, line 20; "acid" should read -- acids --.

Column 10, line 31; "acid," should read -- acids, --.

Column 10, line 31; "acid" (second occurrence) should read
    -- -- acids, --.
```

Signed and Sealed this

Thirtieth Day of November, 1993

Attest:

BRUCE LEHMAN

Attesting Officer

Commissioner of Patents and Trademarks